2 Sheets—Sheet 1.
T. STEBINS.
HYDRAULIC-ELEVATOR.
No. 170,781. Patented Dec. 7, 1875.
FIG. I
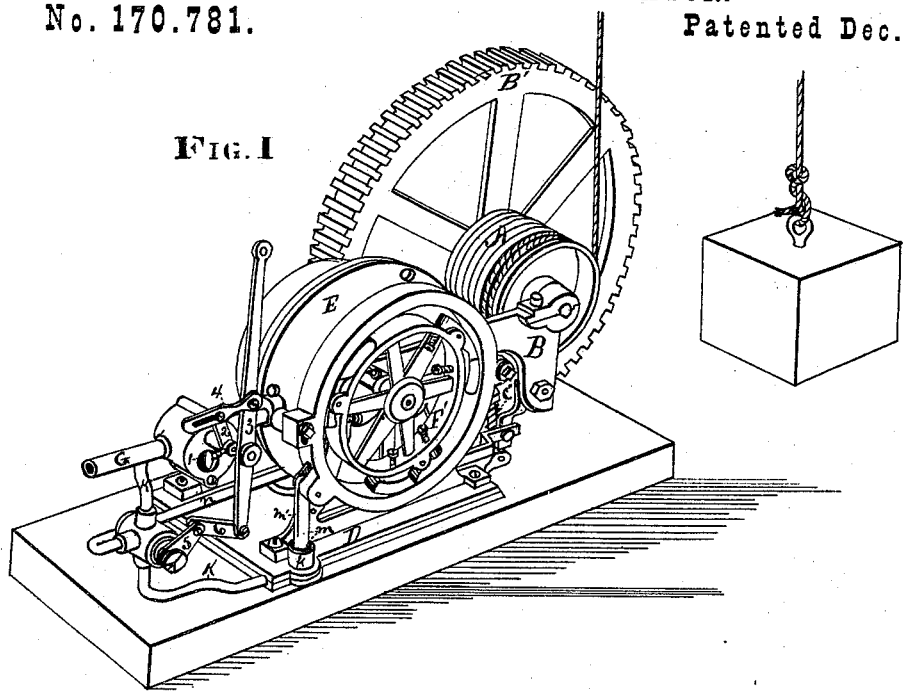
FIG. II
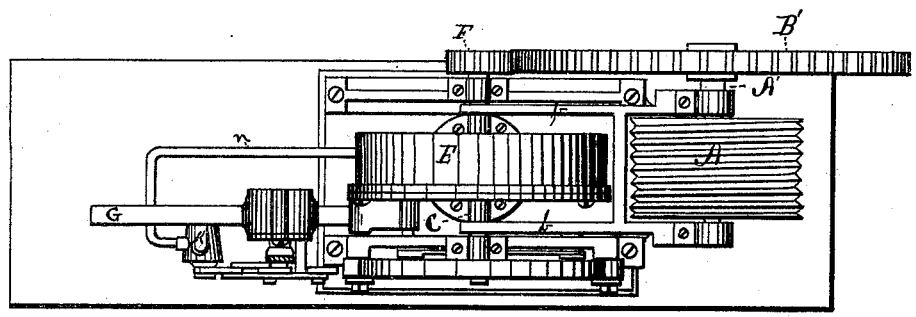
WITNESSES
F. B. Townsend
Will. H. Moxon
INVENTOR
Timothy Stebins
per Atty's
A. H. Evans & Co.

2 Sheets—Sheet 2.
T. STEBINS.
HYDRAULIC-ELEVATOR.
No. 170,781. Patented Dec. 7, 1875.
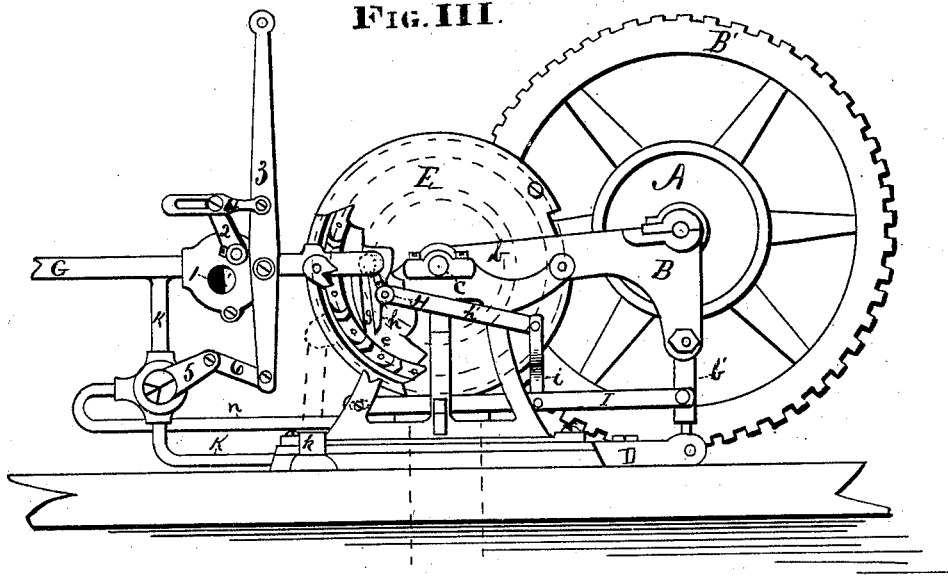
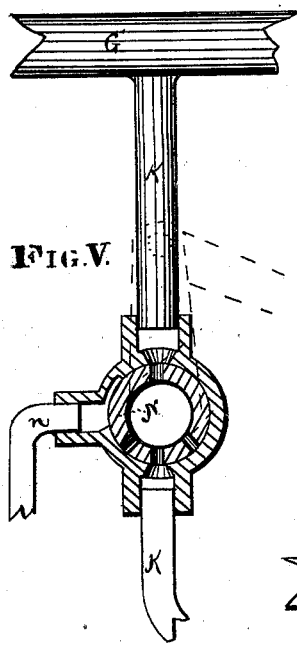
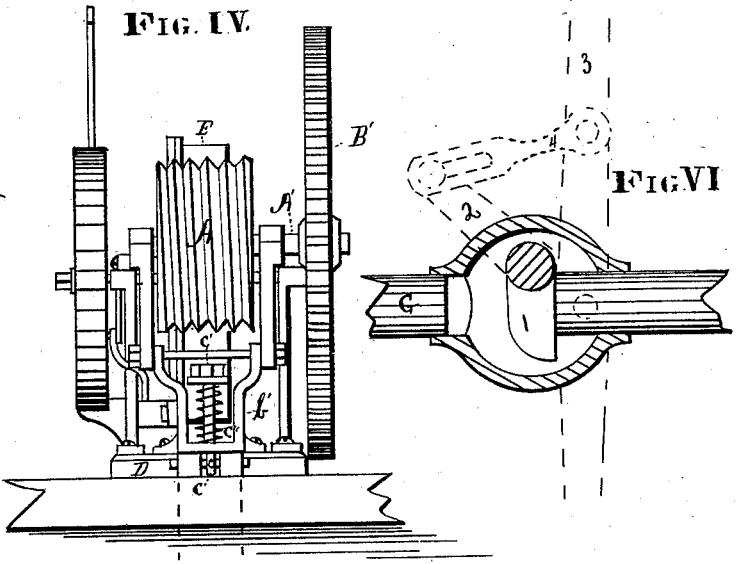
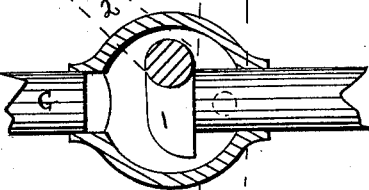
WITNESSES
F. B. Townsend
Will H. Moxon
INVENTOR
Timothy Stebins
per Atty
A. H. Evans & Co

UNITED STATES PATENT OFFICE

TIMOTHY STEBINS, OF BOSTON, MASSACHUSETTS.

IMPROVEMENT IN HYDRAULIC ELEVATORS.

Specification forming part of Letters Patent No. 170,781, dated December 7, 1875; application filed July 30, 1875.

*To all whom it may concern:*

Be it known that I, TIMOTHY STEBINS, of Boston, Massachusetts, have invented certain new and useful Improvements in Hydraulic Elevators; and I do hereby declare the following to be a full, clear, and exact description thereof, reference being had to the accompanying drawings, making a part of this specification, in which—

Figure 1 is a perspective view of a hydraulic apparatus with my invention attached. Fig. 2 is a plan view of the same. Fig. 3 is a side elevation with the brake removed. Fig. 4 is a rear view. Figs. 5 and 6 are details to be referred to.

The object of my invention is to provide a means, first, for controlling and adjusting the expenditure of power used in hydraulic elevators, with a view to avoid waste; and, secondly, for arresting the wheel by a brake, at any desired moment.

In order that those skilled in the art may make and use my invention, I will proceed to describe the exact manner in which I have carried it out.

In the drawings, A represents the drum, over which is wound the lifting chain or cord, rigidly attached to the shaft A', having its bearings in the swinging frame B, and provided at its outer end with a large cog-wheel, B'. The frame B is attached, by the arms $b$ $b$, to the main shaft C. To the rear portion of the frame B is pivoted the yoke $b'$, on which the frame rests. Through the bottom of the yoke passes the pin $c$, pivoted in the bifurcated end of the base-plate D, and provided at its upper end with the adjusting screw-nut $c'$, beneath which is a coil-spring, $c''$, resting on the cross-plate of the yoke. On the main shaft C is secured the water-wheel E, provided with buckets $e\ e$, and revolving within the stationary water-tight casing. On one end of the main shaft C is rigidly attached the pinion F, gearing with the large cog-wheel B', and on the opposite end of the shaft is my patented automatic brake F'. The pipe G admits the water from the main into the wheel through the port $g$, one side or jaw of which is hinged or pivoted, so as to admit of being closed or opened, and thus increase or check the flow of water. The hinged jaw $h$ is rigidly attached to the short shaft H, to the outer end of which is rigidly secured the lever $h'$, the opposite end of the lever being connected by the bar $i$ to the lever I, the outer end of which is pivoted to the side of the yoke $b'$.

It is evident from this description that, whenever the elevator-car is being loaded, the lifting rope or chain will raise the drum A more or less, in proportion to the weight of the load on the car, and with it the swinging frame B and yoke $b'$. This movement results in raising the levers I and $h'$, which causes a partial revolution of the short shaft H, which throws back the hinged jaw $h$, and opens or widens the port $g$, and allows a flow of water exactly in proportion to the weight of the load to be elevated on the car, thus adjusting at all times the flow of water to the weight of the load, and avoiding waste of power. It is also evident the same result would be produced if steam or compressed air were used instead of water.

On the pipe G is placed the valve 1, controlled by the lever-arm 2, which, in turn, is operated by the lever 3 through the slotted arm 4. By means of the valve 1 the water is admitted to the wheel or shut off, as desired. Branching from the pipe G is the pipe K, leading to the cylinder $k$, in which works a piston, M, having the rod M' pivoted to the brake, as shown in Fig. 1. Within the pipe K is placed a four-way cock, N, as shown in Fig. 5, which is also operated by the lever 3 through the pivoted arms 5 and 6. Connected with the pipe K and four-way cock N is the waste-pipe $n$.

The operation of my apparatus is as follows: Supposing it be required that the elevator ascend; by a movement of the lever 3 the valve 1 is opened, and the water is admitted through the port $g$ to the wheel. At the same time the four-way cock closes the connection between the pipe G and cylinder $k$, and opens it between cylinder $k$ and waste-pipe $n$. This takes off the brake while the wheel is in motion, and the elevator-car is rising.

When it is desired to stop the elevator, the reverse motion of lever 3 closes the pipe G, thus shutting off the water from the wheel, while, at the same time, it changes the position of the four-way cock N, closing the wasteway pipe n, and throwing the whole force of the water through the pipe K into the cylinder k, which forces up the piston M and puts on the brake, instantly arresting the movement of the elevator-car.

When it is desired to descend, it is only necessary to shut off the pressure from the cylinder k by means of the four-way cock N, without opening valve 1, there being no necessity for admitting water to the wheel while descending. To effect the opening and closing of the four-way cock N while the elevator is descending is the purpose of the slot in the arm 4, by means of which the lever is allowed to open and close the cock N without disturbing the position of valve 1.

From the foregoing description, it is evident that the wheel and brake may be placed either in a horizontal or vertical position without departing from the spirit of my invention.

Having thus described my invention, what I claim as new, and desire to secure by Letters Patent, is—

1. The wheel E and pipe G, provided with the valve 1, in combination with the pipe K, four-way cock N, exhaust-pipe n, cylinder k, piston M, piston-rod M', and brake F', substantially as and for the purpose specified.

2. The swinging frame B, provided with the yoke b' and drum A, in combination with the levers I and h' and automatic port G, all constructed to operate substantially as and for the purpose set forth.

TIMOTHY STEBINS.

Witnesses:
GEO. F. BRICKETT,
HARRY STEVENS.